(12) United States Patent
Goodwill

(10) Patent No.: US 11,828,829 B2
(45) Date of Patent: Nov. 28, 2023

(54) APPARATUS AND METHOD FOR SCANNING AND RANGING WITH EYE-SAFE PATTERN

(71) Applicant: Dominic John Goodwill, Ottawa (CA)

(72) Inventor: Dominic John Goodwill, Ottawa (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 1037 days.

(21) Appl. No.: 16/562,884

(22) Filed: Sep. 6, 2019

(65) Prior Publication Data

US 2019/0391271 A1    Dec. 26, 2019

Related U.S. Application Data

(63) Continuation of application No. PCT/CA2017/050401, filed on Mar. 31, 2017.

(51) Int. Cl.
  *G01S 17/89* (2020.01)
  *G01S 17/90* (2020.01)
  (Continued)

(52) U.S. Cl.
  CPC .............. *G01S 17/89* (2013.01); *G01S 7/484* (2013.01); *G01S 7/4811* (2013.01); *G01S 7/4814* (2013.01); *G01S 7/4817* (2013.01); *G01S 7/4972* (2013.01); *G01S 17/04* (2020.01); *G01S 17/90* (2020.01); *G01S 7/483* (2013.01)

(58) Field of Classification Search
  CPC ...... G01S 17/89; G01S 7/4811; G01S 7/4814; G01S 7/4817; G01S 7/484; G01S 7/4972; G01S 17/04; G01S 17/90; G01S 7/483; G01S 17/10
  See application file for complete search history.

(56) References Cited

U.S. PATENT DOCUMENTS 6,087,975 A * 7/2000 Sugimoto ............... G01S 7/497
                                                                342/70
6,119,067 A * 9/2000 Kikuchi ................ G01S 7/4026
                                                                342/78

(Continued)

FOREIGN PATENT DOCUMENTS

CN        101918878 A     12/2010
CN        102575926 A      7/2012
(Continued)

OTHER PUBLICATIONS

Pan Qiu-juan et al. Eye safety analysis for 400 1400 nm pulsed lasers systems, Laser and Infrared, Aug. 2010. with English abstract.

*Primary Examiner* — Mohamed K Amara

(57) ABSTRACT

An optical apparatus comprises: a light source configured to emit light composed of a sequence of shots; and a steering device optically coupled to the light source and configured to steer the shots emitted by the light source in accordance with a predefined scan pattern such that at least one intermediate shot is emitted by the light source between a first shot directed by the steering device within an aperture defined by an eye safety regulation and a subsequent, second shot directed by the steering device within the same aperture, each intermediate shot being directed by the steering device outside the aperture.

24 Claims, 9 Drawing Sheets

(51) Int. Cl.
  *G01S 17/04*  (2020.01)
  *G01S 7/481*  (2006.01)
  *G01S 7/484*  (2006.01)
  *G01S 7/497*  (2006.01)
  *G01S 7/483*  (2006.01)

(56) References Cited

U.S. PATENT DOCUMENTS

| | | | |
|---|---|---|---|
| 6,420,698 B1 * | 7/2002 | Dimsdale | G01C 15/002 |
| | | | 250/234 |
| 6,700,529 B2 * | 3/2004 | Matsuura | G01S 7/4811 |
| | | | 342/158 |
| 6,853,328 B1 * | 2/2005 | Guice | G01S 7/411 |
| | | | 342/28 |
| 7,544,945 B2 * | 6/2009 | Tan | G01S 17/87 |
| | | | 250/353 |
| 9,121,703 B1 * | 9/2015 | Droz | G01S 17/04 |
| 9,791,557 B1 * | 10/2017 | Wyrwas | G01S 7/497 |
| 10,527,727 B2 * | 1/2020 | Bondy | G01S 17/58 |
| 11,522,330 B2 * | 12/2022 | Shand | G01S 17/87 |
| 2002/0071108 A1 * | 6/2002 | Go | G03F 7/70041 |
| | | | 355/71 |
| 2002/0175294 A1 * | 11/2002 | Lee | G01N 21/6402 |
| | | | 250/461.1 |
| 2004/0013070 A1 | 1/2004 | Rafferty | |
| 2004/0130702 A1 * | 7/2004 | Jupp | G06V 20/13 |
| | | | 356/5.01 |
| 2005/0219506 A1 * | 10/2005 | Okuda | G01S 17/931 |
| | | | 356/28 |
| 2005/0286104 A1 * | 12/2005 | Sugiura | G02B 26/0858 |
| | | | 359/210.1 |
| 2006/0262324 A1 * | 11/2006 | Hays | G01P 5/26 |
| | | | 356/519 |
| 2008/0278683 A1 * | 11/2008 | Su | A61B 3/14 |
| | | | 351/205 |
| 2011/0149363 A1 | 6/2011 | Harris et al. | |
| 2012/0253331 A1 * | 10/2012 | Liu | A61B 18/203 |
| | | | 606/9 |
| 2015/0277042 A1 | 10/2015 | Goodwill et al. | |
| 2016/0047895 A1 | 2/2016 | Dussan | |
| 2017/0155225 A1 * | 6/2017 | Villeneuve | H01S 3/06758 |
| 2018/0217262 A1 * | 8/2018 | Albelo | G01S 7/4817 |
| 2019/0257946 A1 * | 8/2019 | Ando | G01S 7/4817 |
| 2020/0081449 A1 * | 3/2020 | Albelo | G01S 7/487 |
| 2020/0232611 A1 * | 7/2020 | Raring | H01S 5/0233 |
| 2021/0194206 A1 * | 6/2021 | Raring | H04B 10/116 |

FOREIGN PATENT DOCUMENTS

| | | | | |
|---|---|---|---|---|
| CN | 105333815 A | | 2/2016 | |
| CN | 205507082 U | | 8/2016 | |
| CN | 105980896 A | | 9/2016 | |
| CN | 105981238 A | | 9/2016 | |
| CN | 110402398 A | * | 11/2019 | ............ G01S 17/89 |
| EP | 1901093 B1 | * | 11/2018 | ............ G01S 17/89 |
| JP | 3802394 B2 | * | 7/2006 | ............ G01S 17/93 |
| WO | WO-2014014838 A2 | * | 1/2014 | ............ G06F 3/013 |
| WO | 2016180146 A1 | | 11/2016 | |

* cited by examiner

FIG. 4

| Pos.\Row | 1 | 2 | 3 | 4 | 5 | 6 | 7 | 8 | 9 | ... | 117 | 118 | 119 | 120 |
|---|---|---|---|---|---|---|---|---|---|---|---|---|---|---|
| 1 | 1 | 151 | 301 | 451 | 2 | 152 | 302 | 452 | 3 | ... | 30 | 180 | 330 | 480 |
| 2 | 601 | 751 | 901 | 1051 | 602 | 752 | 902 | 1052 | 603 | ... | 630 | 780 | 930 | 1080 |
| 3 | 1201 | 1351 | 1501 | 1651 | 1202 | 1352 | 1502 | 1652 | 1203 | ... | 1230 | 1380 | 1530 | 1680 |
| 4 | 1801 | 1951 | 2101 | 2251 | 1802 | 1952 | 2102 | 2252 | 1803 | ... | 1830 | 1980 | 2130 | 2280 |
| 5 | 31 | 181 | 331 | 481 | 32 | 182 | 332 | 482 | 33 | ... | 60 | 210 | 360 | 510 |
| 6 | 631 | 781 | 931 | 1081 | 632 | 782 | 932 | 1082 | 633 | ... | 660 | 810 | 960 | 1110 |
| 7 | 1231 | 1381 | 1531 | 1681 | 1232 | 1382 | 1532 | 1682 | 1233 | ... | 1260 | 1410 | 1560 | 1110 |
| 8 | 1831 | 1981 | 2131 | 2281 | 1832 | 1982 | 2132 | 2282 | 1833 | ... | 1860 | 2010 | 2160 | 2310 |
| 9 | 61 | 211 | 361 | 511 | 62 | 212 | 362 | 512 | 63 | ... | 90 | 240 | 390 | 540 |
| ... | ... | ... | ... | ... | ... | ... | ... | ... | ... | ... | ... | ... | ... | ... |
| 17 | 121 | 271 | 421 | 571 | 122 | 272 | 422 | 572 | 123 | ... | 150 | 300 | 450 | 600 |
| 18 | 721 | 871 | 1021 | 1171 | 722 | 872 | 1022 | 1172 | 723 | ... | 750 | 900 | 1050 | 1200 |
| 19 | 1321 | 1471 | 1621 | 1771 | 1322 | 1472 | 1622 | 1682 | 1772 | ... | 1350 | 1500 | 1650 | 1800 |
| 20 | 921 | 2071 | 2221 | 2371 | 1922 | 2072 | 2222 | 2372 | 1932 | ... | 1950 | 2100 | 2250 | 2400 |

FIG. 6

| Pos.\Row | 1 | 2 | 3 | 4 | 5 | 6 | 7 | 8 | 9 | ... | 117 | 118 | 119 | 120 |
|---|---|---|---|---|---|---|---|---|---|---|---|---|---|---|
| 1 | 1 | 151 | 241 | 361 | 2 | 122 | 242 | 362 | 3 | ... | 30 | 150 | 270 | 390 |
| 2 | 481 | 601 | 721 | 841 | 482 | 602 | 722 | 842 | 483 | ... | 510 | 630 | 750 | 870 |
| 3 | 961 | 1081 | 1201 | 1321 | 962 | 1082 | 1202 | 1322 | 963 | ... | 990 | 1110 | 1230 | 1350 |
| 4 | 1441 | 1561 | 1681 | 1801 | 1442 | 1562 | 1682 | 1802 | 1443 | ... | 555 | 600 | 645 | 690 |
| 5 | 31 | 151 | 271 | 391 | 32 | 152 | 272 | 392 | 33 | ... | 60 | 180 | 300 | 420 |
| 6 | 511 | 631 | 751 | 871 | 512 | 632 | 752 | 872 | 513 | ... | 540 | 660 | 780 | 900 |
| 7 | 991 | 1111 | 1231 | 1351 | 992 | 1112 | 1232 | 1352 | 993 | ... | 1020 | 1140 | 1260 | 1380 |
| 8 | 1471 | 1591 | 1711 | 1831 | 1472 | 1592 | 1712 | 1832 | 1473 | ... | 1500 | 1620 | 1740 | 1860 |
| 9 | 1 | 61 | 121 | 181 | 2 | 62 | 122 | 182 | 3 | ... | 30 | 90 | 150 | 210 |
| 10 | 241 | 301 | 361 | 421 | 242 | 302 | 362 | 422 | 243 | ... | 270 | 330 | 390 | 450 |
| 11 | 481 | 541 | 601 | 661 | 482 | 542 | 602 | 662 | 483 | ... | 510 | 570 | 630 | 690 |
| 12 | 721 | 781 | 841 | 901 | 722 | 782 | 842 | 902 | 723 | ... | 750 | 810 | 870 | 930 |
| 13 | 31 | 91 | 151 | 211 | 32 | 92 | 152 | 212 | 33 | ... | 60 | 120 | 180 | 240 |
| 14 | 271 | 331 | 391 | 451 | 272 | 332 | 392 | 452 | 273 | ... | 300 | 360 | 420 | 480 |
| 15 | 511 | 571 | 631 | 691 | 512 | 572 | 632 | 692 | 513 | ... | 540 | 600 | 660 | 720 |
| 16 | 751 | 811 | 871 | 931 | 752 | 812 | 872 | 932 | 753 | ... | 780 | 840 | 900 | 960 |
| 17 | 61 | 181 | 301 | 421 | 62 | 182 | 302 | 422 | 90 | ... | 30 | 210 | 330 | 450 |
| 18 | 541 | 661 | 781 | 901 | 542 | 662 | 782 | 902 | 543 | ... | 570 | 690 | 810 | 930 |
| 19 | 1021 | 1141 | 1261 | 1381 | 1022 | 1142 | 1262 | 1382 | 1023 | ... | 1170 | 1110 | 1290 | 1410 |
| 20 | 1501 | 1621 | 1741 | 1861 | 1502 | 1622 | 1742 | 1862 | 1503 | ... | 1530 | 1650 | 1770 | 1890 |
| 21 | 91 | 211 | 331 | 451 | 92 | 212 | 332 | 452 | 93 | ... | 120 | 240 | 360 | 480 |
| 22 | 571 | 691 | 811 | 931 | 572 | 692 | 812 | 932 | 573 | ... | 600 | 720 | 840 | 960 |
| 23 | 1051 | 1171 | 1291 | 1411 | 1052 | 1172 | 1292 | 1412 | 1053 | ... | 1080 | 1200 | 1320 | 1440 |
| 24 | 1531 | 1651 | 1771 | 1891 | 1532 | 1652 | 1772 | 1892 | 1533 | ... | 1560 | 1680 | 1800 | 1920 |

Rows 1–8: Region 1A
Rows 9–16: Region 2
Rows 17–24: Region 1B 800
504

FIG. 8

APPARATUS AND METHOD FOR SCANNING AND RANGING WITH EYE-SAFE PATTERN

CROSS REFERENCE TO RELATED APPLICATION

This application is a continuation of International Application No. PCT/CA2017/050401 filed Mar. 31, 2017 entitled "APPARATUS AND METHOD FOR SCANNING AND RANGING WITH EYE-SAFE PATTERN" the contents of which are incorporated herein by reference.

FIELD OF THE INVENTION

The present invention pertains to the field of optical sensing, and in particular to apparatus and method for scanning and ranging with eye-safe pattern.

BACKGROUND

Light Detection and Ranging (LIDAR) systems are known in the art, and have been identified as a useful technology for machine vision systems for use in various applications such as robotics, autonomous vehicles, and so-called driverless or self-driving cars. In very general terms, a LIDAR system includes a transmitter for transmitting pulses of light into a defined field of view of the LIDAR, and a receiver for detecting light reflected from objects within the defined field of view. A processor can then analyse the reflected light detected by the receiver to infer the presence and location of those objects. In some cases, a pulse (or "shot") may be made up of multiple sub-pulses.

The transmitter is configured to transmit pulses (or "shots") of light in a narrow beam that can be steered to enable the entire field of view to be scanned within a predetermined scanning period. When a pulse (or shot) illuminates an object within the field of view of the LIDAR system, some of the light is scattered back toward the LIDAR system, and may be detected by the receiver. The "time of flight" between the transmission of a pulse and detection of the corresponding scattered light is indicative of distance to the point from which the light was scattered, while the direction of the transmitter beam (as determined by the steering device) can be used to determine the direction to the point from which the light was scattered. The distance and direction information associated with each shot can be processed to derive a "point cloud" indicative of the locations from which scattered light has been detected. This point cloud can be further processed to infer the size, location and possibly other characteristics of objects within the field of view.

It is desirable to maximize the power of the light pulses transmitted by the transmitter. However, eye safety regulations as defined in the American National Standards Institute (ANSI) standard Z136.1-2014 and in the International Electrotechnical Commission (IEC) standard 60825-1 limit the maximum permissible optical power incident on a defined aperture to about 200 nJ in a 5 µs interval.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide methods and apparatus for increasing the optical power of the light emitted by a transmitter, while conforming to applicable eye safety regulations.

Accordingly, an aspect of the present invention provides an optical apparatus comprising: a light source configured to emit light composed of a sequence of shots; and a steering device optically coupled to the light source and configured to steer the shots emitted by the light source in accordance with a predefined scan pattern such that at least one intermediate shot is emitted by the light source between a first shot directed by the steering device within an aperture defined by an eye safety regulation and a subsequent, second shot directed by the steering device within the same aperture, each intermediate shot being directed by the steering device outside the aperture.

A further aspect of the present invention provides a method of controlling an optical apparatus comprising a light source configured to emit light comprising a sequence of shots, and a steering device optically coupled to the light source. The method comprises controlling the steering device to steer the shots emitted by the light source in accordance with a predefined scan pattern such that at least one intermediate shot is emitted by the light source between a first shot directed by the steering device within an aperture defined by an eye safety regulation and a subsequent, second shot directed by the steering device within the same aperture, each intermediate shot being directed by the steering device outside the aperture.

BRIEF DESCRIPTION OF THE FIGURES

Further features and advantages of the present invention will become apparent from the following detailed description, taken in combination with the appended drawings, in which:

FIG. 1A schematically illustrates elements of a Light Detection and Ranging (LIDAR) system; FIG. 1B illustrates an example waveform of a light emitted by the light source of FIG. 1A; FIG. 1C schematically illustrates an example illustrates an Optical Waveguide Tunable Phased Array steering device; and FIG. 1D schematically illustrates an example illustrates an Optical Waveguide Tunable Array steering device with a tunable laser;

FIG. 4 illustrates a 2-dimensional scan pattern in accordance with an example embodiment of the present invention;

FIG. 6 illustrates a second 2-dimensional scan pattern in accordance with an example embodiment of the present invention;

FIG. 8 illustrates a fifth scan pattern in accordance with an example embodiment of the present invention.

It will be noted that throughout the appended drawings, like features are identified by like reference numerals.

DETAILED DESCRIPTION

Figure 1A:
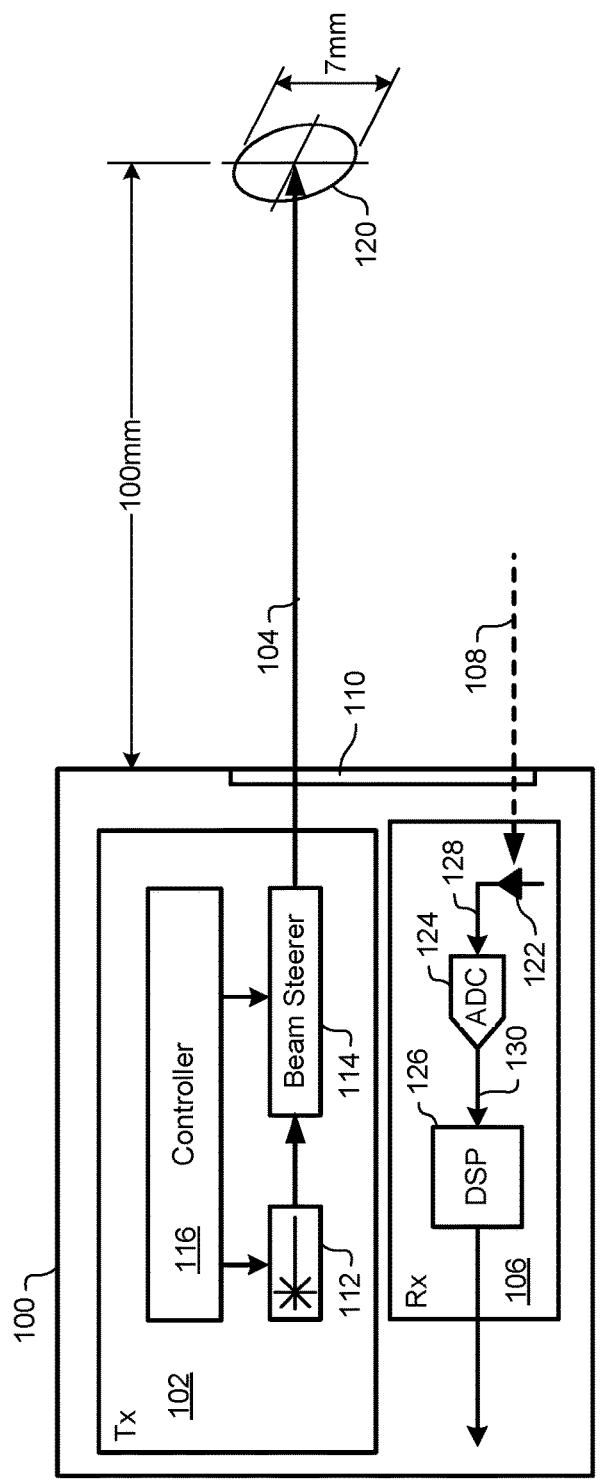
FIGS. 1A-1D schematically illustrate elements and operation of a Light Detection and Ranging (LIDAR) system.

FIG. 1A schematically illustrates elements of a Light Detection and Ranging (LIDAR) system 100. In the example of FIG. 1A, the LIDAR system 100 comprises a transmitter 102 configured to transmit light 104, and a receiver 106 configured to detect reflected light 108. One or more windows 110 are provided to permit light 104 emitted from the transmitter 102 to exit the LIDAR system 100, and to permit reflected light 108 to enter the LIDAR system and impinge on the receiver 106. In the example of FIG. 1A, the transmitter 102 comprises a light source 112, a steering device 114 and a controller 116 which operates to control the light source 112 and steering device 114.

Figure 1B:
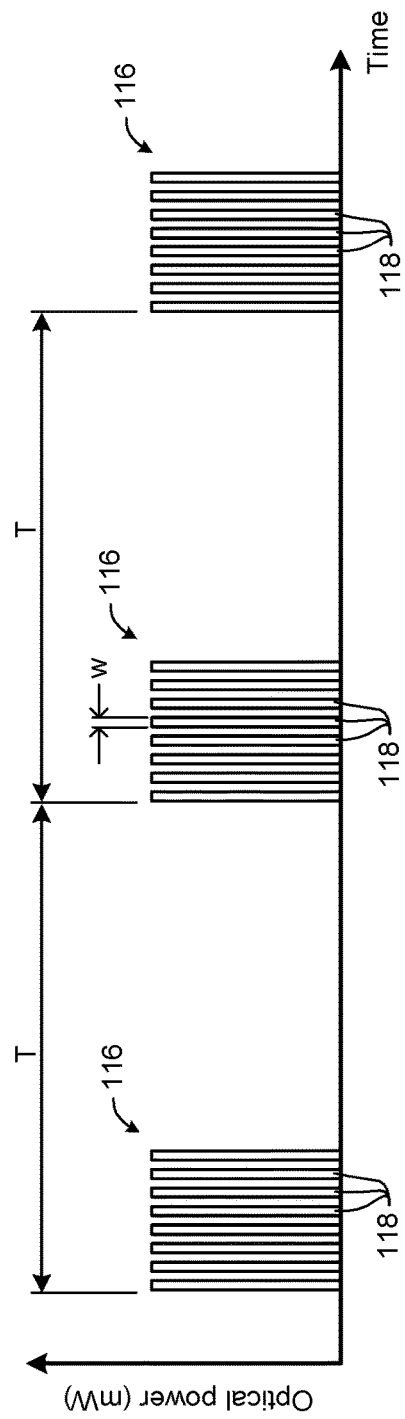

The light source 112 is preferably provided as a laser configured to emit light 104 at a predetermined wavelength and optical power level. The light source 112 may be for example an Infra-Red (IR) laser emitter configured to emit light having a wavelength of 600-1000 nm. As may be seen in FIG. 1B, the light 104 may be emitted as a series of "shots" 116. Each of the shots may include a plurality of optical pulses 118. The number of pulses 118 in each shot 116, along with the power level and duration (w) of each pulse 118 may be selected to enable reliable detection of reflected light 108 by the receiver 106. In some embodiments each shot 116 may include 10 pulses 118, while other embodiments may use as many as 20 or more pulses 118 in each shot 116. A low-cost laser of a type usable in LIDAR systems may emit laser pulses having a duration (w) of 5 ns, and a pulse energy of 1 nJ, for a peak power level of 0.2 Watts. The frequency (1/T) at which shots are emitted may vary between 40 kHz and 500 kHz, depending largely on limitations of the steering device 114.

As may be appreciated, in order to increase the range at which objects within the LIDAR field of view may be detected, it is desirable to increase the energy of each pulse 118. However, since light having a wavelength in the 600-1000 nm range can be focussed and absorbed by the eye, the maximum output of such a laser is limited by eye safety regulations, such as those defined in the American National Standards Institute (ANSI) standard Z136.1-2014 and in the International Electrotechnical Commission (IEC) standard 60825-1. These two standards have similar technical rules, albeit expressed in slightly differing language. In the present disclosure, embodiments of the invention will be described with reference to the nomenclature of ANSI Z136.1-2014, but it should be understood that the invention also applies to IEC 60825-1, as well as successors and counterparts of both of these standards. For example, ANSI Z136.1-2014 defines a Maximum Permissible Exposure (MPE) and an Accessible Emission Limit (AEL). The MPE is the maximal optical radiation level a person can be exposed to before undergoing immediate or long term injuries. This maximum permissible exposure was established from the energy density limits, or the power-per-surface-unit (intensity) limits, that can be admitted on the cornea and on the skin. The MPE is calculated as a function of the radiation wavelength, the pulse duration, the exposure duration of the exposed tissue (skin or eye), and the size of the image on the retina. While the MPE defines the maximum pulse energies in terms of risk of injury, the AEL is derived from the radiation wavelength, power and energy emitted by the laser and accessible to a user (as represented by a defined aperture 120 (FIG. 1A) at a specified distance from the window 110. Such definitions are use by eye safety regulations as they represent a realistic closest approach to a window by a human eye or an observation instrument such as a telescope. For example, using the definitions of ANSI Z136.1-2014 the aperture 120 may be defined as a circular area having a diameter of 7 mm at a distance of 100 mm from the window. The AEL therefore enables the classification of lasers according to the related radiation hazard, depending on the characteristics of each laser. For example, the ANSI Class 1 AEL for a wavelength of 905 nm is defined as: AEL=200 nJ in a time interval (t) of 5 ps<t≤5 µs, and as AEL=($t^{0.75}$*1.8) mJ for 5 µs<t≤10 s, where t is defined in units of seconds.

The steering device 114 is configured to direct the light 104 to scan a selected field of view of the LIDAR system. Example beam steering devices include moving (e.g. rapidly rotating) mirrors, or Spatial Light Modulator (SLM) devices such as Liquid Crystal on Silicon (LCoS) devices. In one embodiment, an Optical Waveguide Tunable Phased Array or Optical Waveguide Phased Array with a Tunable laser may be used to steer the beam. FIG. 1C schematically illustrates an example Optical Waveguide Tunable Phased Array steering device. In the example of FIG. 1C, the steering device, comprises a 1:n optical power splitter 132 which is configured to divide the light emitted from the light source 112 into a sent of n optical paths 134. Each path 134 includes an optical phase shifter 136 and an emitter 138. The emitters 138 may take any suitable form (such as mirrors, waveguide tapers, or diffraction gratings, for example) such that light entering the emitter 138 from its corresponding phase shifter 136 will be emitted within a predetermined emission cone (not shown). Each phase shifter 136 operates to impose a phase shift on light propagating within the respective optical path 134 in accordance with a respective control signal 140 from the controller 116. With this arrangement, light emitted from the light source 112 is divided by the 1:n splitter 132 and supplied to each optical path 134. The light propagating within each optical path 134 is then subjected to a respective phase shift before being emitted from the corresponding emitter 138. The lights emitted from the emitters 138 recombine (due to constructive and destructive interference) to form one or more beams that propagate away from the emitters 138 (out of the page of the drawing of FIG. 1C) at an angle that is dependent on the phase shifts imposed by each of the phase shifters 136. The direction of the (or each) beam can therefore be controlled by controlling the respective phase shift imposed by each phase sifter 136.

Figure 1D:
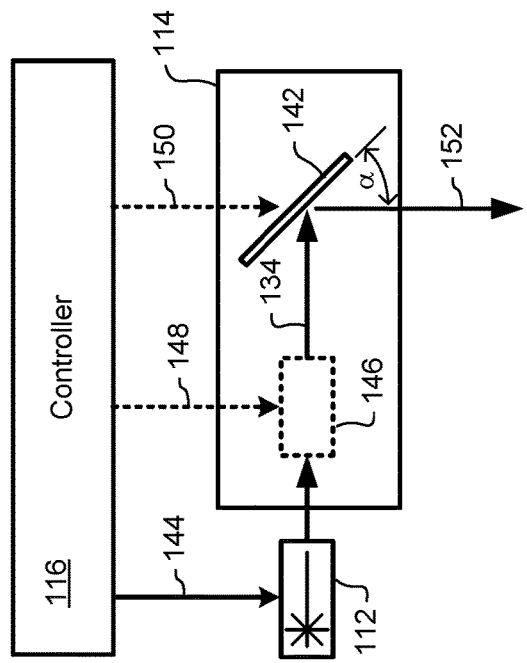
Figure 1C:
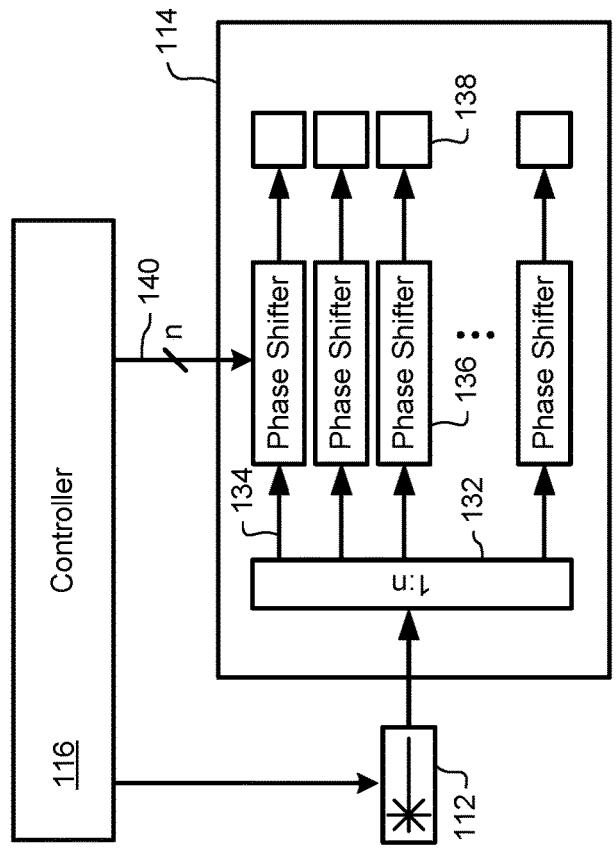

FIG. 1D schematically illustrates an example illustrates an Optical Waveguide Tunable Array steering device with a tunable laser. In the example of FIG. 1D, the steering device 114, comprises an optical path 134 that includes a diffraction grating 142, which will generate a reflected light beam 152 at an angle (α) that is dependent on the optical frequency. In this example, the laser 112 is preferably configured as a tunable laser capable of emitting light at a desired frequency (or wavelength) in accordance with a suitable control signal 144 from the controller 116. Optionally, the frequency response of the light source 112 may be supplemented by a phase shifter 146 operating in accordance with a suitable control signal 148 from the controller 116. This control signal 148 may be computed making use of the differential relationship between phase and frequency. With this arrangement, light emitted from the light source 112 is supplied to the diffraction grating 142. The reflected light emitted from the diffraction grating 142 will form one or more beams 152 that propagate away from the diffraction grating 142 (in the plane of the page of the drawing of FIG. 1D) at an angle that is dependent on the relationship between the frequency (or wavelength) of the light and the spacing of the diffraction grating 142. The direction of the (or each) beam can therefore be controlled by controlling the optical frequency of the light incident on the diffraction grating 142.

In a further alternative arrangement, the diffraction grating 142 may be replaced with a LCoS spatial light modulator (SLM). In this arrangement the fixed frequency light source 112 may be used to generate the light beam, which is made incident on the LCoS SLM. In this case, the beam is steered solely by the LCoS SLM in accordance with the control signal 150 from the controller 116.

For ease of illustration and description, the example steering devices 114 shown in FIGS. 1C and 1D are configured to steer the light beam in 1 dimension. It is contemplated that extension of these examples to enable steering of the light beam in 2 dimensions will be well within the purview of hose of ordinary skill in the art.

The steering device 114 may be operated to direct the light 104 to trace a specific pattern across the field of view, such as a raster-scan pattern or a Lissajous-figure scan pattern, for example. With all scanning patterns, the light 104 is directed to scan the LIDAR field of view so as to illuminate any objects within the field of view and enable detection of a point cloud from which information about illuminated objects may be inferred.

In the example of FIG. 1A, the receiver 106 comprises a photodetector 122, an Analog-to-Digital Converter (ADC) 124, and a Digital Signal Processor (DSP) 126. Other optical and electronic devices, such as lenses, mirrors, filters or amplifiers may be used, but are not illustrated in FIG. 1 in order to simplify the description. The photodetector 122 operates in a conventional manner to detect reflected light 108 a generate a corresponding photodetector signal 128. The ADC samples the photodetector signal 128 at a predetermined sample rate, and supplies a corresponding digital sample stream 130 to the DSP 126. With this arrangement, the time of flight may be determined by the DSP 126 in various ways. For example, in some embodiments, the time of flight may be determined by the sample rate of the ADC. For example, a sample rate of 1 GHz represents a sample period of 1 ns. This allows the time of flight to be determined (to a resolution of 1 ns) by counting the number of samples received by the DSP 126 between the time at which a shot of light 104 is emitted by the transmitter 102 and detection of the corresponding scattered light 108. Furthermore, the distance to the point from which the reflected light 108 was scattered can be estimated (e.g. to a resolution of ±15 cm) by recognising that light travels in air approximately 30 cm in 1 ns.

The present invention provides techniques for controlling the light source 112 and the steering device 114 to increase (in comparison to conventional techniques) the optical pulse energy output by the LIDAR transmitter 102 while maintaining safe levels of pulse energy accessible to a user as represented by a predetermined aperture 120 (FIG. 1A) at a specified distance from the window 110 of the LIDAR unit 100. An advantage of the present invention is that the pulse energy emitted by the LIDAR system 100 may be significantly greater than prior art systems, without exceeding limits imposed by eye safety regulations.

For the purposes of the present disclosure, the aperture 120 shall be considered to be defined by the applicable eye safety regulations, such as, for example, the American National Standards Institute (ANSI) standard Z136.1-2014. It is convenient to describe the size of the aperture as a "reference dimension". Where the aperture 120 is defined as a circular planar area at a defined distance from the LIDAR window 110 (as shown in FIG. 1A), the "reference dimension" may conveniently be considered to be the diameter of the planar area. Thus, for example, in ANSI standard Z136.1-2014, the aperture 120 is a circular planar area positioned 100 mm from the LIDAR window 110, and having a diameter of 7 mm. In this case, the reference dimension is 7 mm, corresponding with the diameter of the aperture. For ease of description in the present disclosure, this nomenclature will be used. However, it will be appreciated that the aperture (and therefore the reference dimension) may be defined in other ways. For example, the aperture may be defined as a region bounded by a circle that is at a defined distance from a given center point. In such a case, the dimensions of the aperture may be defined using polar coordinates, and the reference dimension may therefore be an angle subtending the aperture.

In accordance with the present invention, the optical pulse energy may be increased without exceeding eye safe exposure limits by providing an optical apparatus comprising light source configured to emit light composed of a sequence of shots; and a steering device optically coupled to the light source. The steering device is configured to steer the shots emitted by the light source in accordance with a predefined scan pattern such that at least one intermediate shot is emitted by the light source between a first shot directed by the steering device within an aperture defined by an eye safety regulation and a subsequent, second shot directed by the steering device within the same aperture. Each intermediate shot is directed by the steering device outside the aperture. Preferably, more than one intermediate shots are emitted between the first shot directed within the aperture and the subsequent second shot directed within that same aperture. Preferably, the first shot directed within the aperture and the subsequent second shot directed within that same aperture form a non-zero angle therebetween. For the purposes of this disclosure, a shot is considered to be directed within the aperture if the center (or "aim point") of that shot falls within the aperture.

In some embodiments, the light source 112 and the steering device 114 are configured to output a single beam. In such embodiments, the scan pattern is selected to provide a separation between any two successive shots that is at least equal to the reference dimension. This ensures that there will be at least one intermediate shot between a first shot directed within a given aperture and a next shot directed within that same aperture.

In other embodiments, the light source and the steering device 114 are configured to output two or more beams simultaneously. In such embodiments, the steering device 114 is further configured to provide a separation between any two of the beams that is at least equal to the reference dimension, and the scan pattern is selected to provide, for all of the beams, a separation between any two successive shots that is at least equal to the reference dimension.

Example embodiments are described below with reference to FIGS. 2-4.

Figure 2:
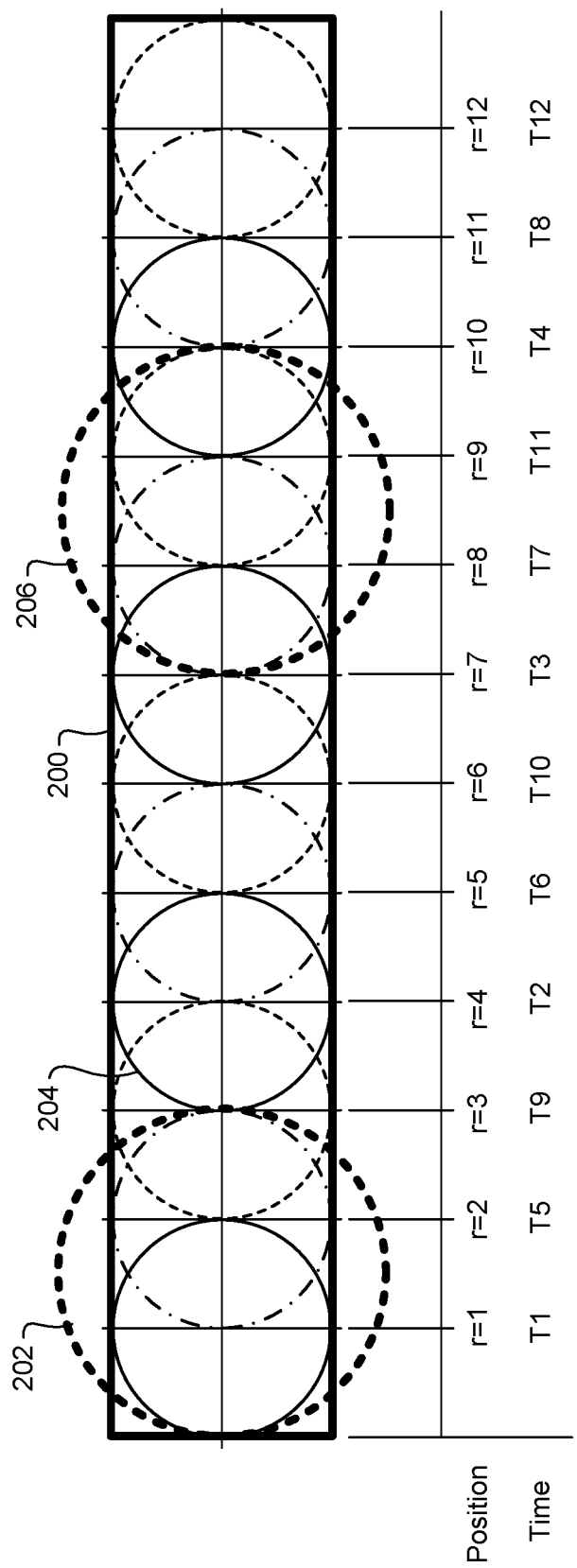
FIG. 2 illustrates a linear scan pattern in accordance with an example embodiment of the present invention.

FIG. 2 illustrates an embodiment in which a single beam is used to scan a linear field of view 200 of the LIDAR system 100. In the example of FIG. 2, the reference dimension is represented by a dashed circle 202 corresponding to the aperture 120. The light 104 emitted by the LIDAR transmitter 102 is considered to form a beam spot 204 in the plane of the aperture 120. The beam spot 204 has a diameter corresponding to the height of the field of view 200 of the LIDAR system 100. In the illustrated embodiment, the beam spot 204 has a radius equal to ⅓ of the reference dimension 202. In order to scan the entire field of view 200, the controller 116 operates (for example in accordance with firmware stored in a memory) to control the steering device 114 to direct the light 104 through a set of 12 positions (labeled as r=1 . . . r=12 in FIG. 2) along the length of the field of view 200, with each position offset from its neighbors by the radius of the beam spot 204. With this arrangement, the entire field of view 200 may be scanned using a series of 12 shots, which may be emitted by the transmitter 102 at times T1-T12.

In accordance with the present invention, the steering device 114 is controlled to direct the light 104 to each one of the set of 12 positions in accordance with a scan pattern is selected to provide a separation between any two successive shots that equal to or greater than the reference dimension. In the example, of FIG. 2, the scan pattern is implemented as a multi-pass scan, in which three passes are used to reach all of the 12 positions (r=1 ... r=12). Thus, in a first pass, shots emitted at times T1, T2, T3 and T4 are directed to positions r=1, r=4, r=7 and r=10, respectively. In a second pass, shots emitted at times T5, T6, T7 and T8 are directed to positions r=2, r=5, r=8 and r=11, respectively. Finally, in the third pass, shots emitted at times T9, T10, T11 and T12 are respectively directed to positions r=3, r=6, r=9 and r=12.

As may be seen, within each pass, successive shots are directed to respective positions that are separated by a distance of 3*r, which corresponds with the reference dimension 202. Furthermore, between each pass, successive shots (i.e., shots T4 and T5, and shots T8 and T9) are directed to respective positions which are separated by a distance of 8*r, which is greater than the reference dimension 202.

Inspection of FIG. 2 also shows that for any position of the aperture 120, there are 3 intermediary shots between a first shot that is directed within any given aperture 120 and a subsequent second shot directed within that same aperture. For example, the circle 202 shown in FIG. 2 represents an aperture 120 located at the extreme left end of the field of view 200. This aperture 120 receives light 104 from shots T1, T5 and T9, each of which is separated by 3 intermediary shots which are directed outside of the aperture. Furthermore, it will be seen that the aim point of each of shots T1, T5 and T9 are separated from each other by a non-zero angle. The interval between successive shots incident on a common aperture is therefore equal to 4 times the shot period T. The presence of intermediary shots increases the allowable optical energy of each pulse as compared to conventional techniques, without violating the eye safety regulations. The three examples described below illustrate this advantage.

It may be recognised that there may be positions of the aperture for which some light from two successive shots may be incident on a common aperture. For example, the circle 206 shown in FIG. 2 represents an aperture 120 located md-way between positions r=8 and r=9. This aperture 120 receives light 104 from shots T3, T7, T11 and T4. However, less than half of the shot energy from each of shots T3 and T4 falls within the aperture, so that the combined optical energy received by the aperture (from shots T3 and T4) is less than the total energy emitted by the transmitter 102 in a single shot. Consequently, for the purposes of calculating eye safe optical power levels, the two partial shots at r=7 and r=10 can be replaced by a single whole shot at the timing of either T3 or T4.

Example 1: Continuous Scanning

As noted above, the ANSI Class 1 AEL for a wavelength of 905 nm is defined as: AEL=200 nJ in a time interval (t) of 5 ps≤t≤5 µs, and as AEL=(t$^{0.75}$*1.8) mJ for 5 µs<t≤10 s. For the purposes of this example, we will consider the case of a 5 µs interval, so the AEL is 200 nJ. For the laser properties, we may consider a laser 112 configured to generate shots at a frequency of 500 kHz, so that the period T=2 µs. Eye safety regulations specify that the allowable AEL is defined according to the worst-case scenario. In this example, in any given 5 µs interval there are either 2 or 3 shots, and thus in the worst case 3 shots will be incident on a given aperture within a 5 µs interval. Furthermore, we will consider that the laser 112 is configured to generate a total of 20 pulses in each shot. This means that the maximum allowable laser energy is 200 nJ per interval/3 shots per interval=67 nJ per shot. For the case of 20 pulses per shot, the maximum allowable energy per pulse is 3 nJ.

Example 2: Embodiment of FIG. 2

In the example of FIG. 2, the scan pattern ensures that the interval between successive (whole) shots directed on a common aperture is equal to 4 times the shot period T. For the case of T=2 µs, the interval is 8 µs. An AEL of 200 nJ per 5 µs interval is equivalent to 320 nJ per 8 µs interval. Since the scan pattern ensures that no more than one (whole) shot will be incident on any given aperture in this 8 µs interval, the maximum safe laser energy is 320 nJ per shot, or 16 nJ per pulse. This represents 5.3 times more energy per pulse than would be permitted using conventional techniques.

More generally, the energy of each shot can be determined as:

$$Es = \left(\frac{AEL}{t}\right) \times (N+1)T$$

where Es is the energy of each shot, AEL is the defined amount of energy incident on the defined aperture during the predetermined time interval, t is the duration of the predetermined time interval, N is the number of intermediate shots, and T is the shot period. In the example of FIG. 2, the number of intermediary shots, N, is 3; AEL-200 and t=5 µs. Using this nomenclature, the energy of each pulse is simply $$Ep = \frac{Es}{P}$$

where: Ep is the energy of each pulse, and P is the number of pulses in each shot.

Example 3: Increased Interval

The example of FIG. 2 is simplified for ease of description and understanding. In a practical LIDAR system, the number of intermediary shots between any two shots that are incident on a given aperture may be significantly greater. For example, consider a LIDAR system having a field of view 300 that is 120° wide, each shot 304 has a radius of 1°, and the aperture 302 has a diameter of 4°. As may be seen in FIG. 3, the scan pattern is similar to the example of FIG. 2, except that the laser beam is steered through 120 discrete positions (r=1 r=120), and the reference dimension is equal to four times the beam radius. A total of four passes are required to scan the entire field of view 300, and any given aperture 302 will receive energy from four separate shots. This implies that the interval between successive shots incident on any given aperture is equivalent to 120 positions/4 passes=30 times the shot period T. For the case of T=2 µs, the interval between successive shots incident on any given aperture is 60 µs. An AEL of 200 nJ per 5 µs interval is equivalent to 1200 nJ per 60 µs interval. Since the scan pattern ensures that no more than one shot will be incident on any given aperture in this 60 µs interval, the maximum safe laser energy is 1200 nJ per shot, or 60 nJ per pulse (assuming 20 pulses per shot). This represents 20 times more energy per pulse (equivalent to an increase of 13 dB of optical signal strength) than would be permitted using conventional techniques.

As may be appreciated, increasing the energy per pulse produces a corresponding increase in the performance of the LIDAR system. For example, it is useful to calculate a distance through fog at which the LIDAR receiver 106 can reliably detect light 108 reflected from an object. For this purpose, it is common to consider fog as attenuating light via absorption and scattering at a rate of 4 dB per 20 meters. Since the light reaching the receiver 106 is first emitted from the transmitter 102 before reflecting off the object, the round-trip loss due to fog is equivalent to 4 dB per 10 meters of separation between the object and the LIDAR system 100. Furthermore, increasing the distance (d) between the LIDAR receiver 106 and an object reduces the energy of the reflected light 108 detected by the receiver in accordance with the inverse square law $$\left(\frac{1}{d^2}\right).$$

Taking these factors into account, and assuming that the energy of the reflected light 108 at the receiver 106 must remain unchanged to ensure accurate detection of objects, a 13 dB increase in the energy of each pulse emitted by the transmitter translates into an increased detection range of approximately 25 meters, relative to conventional systems.

Figure 3:
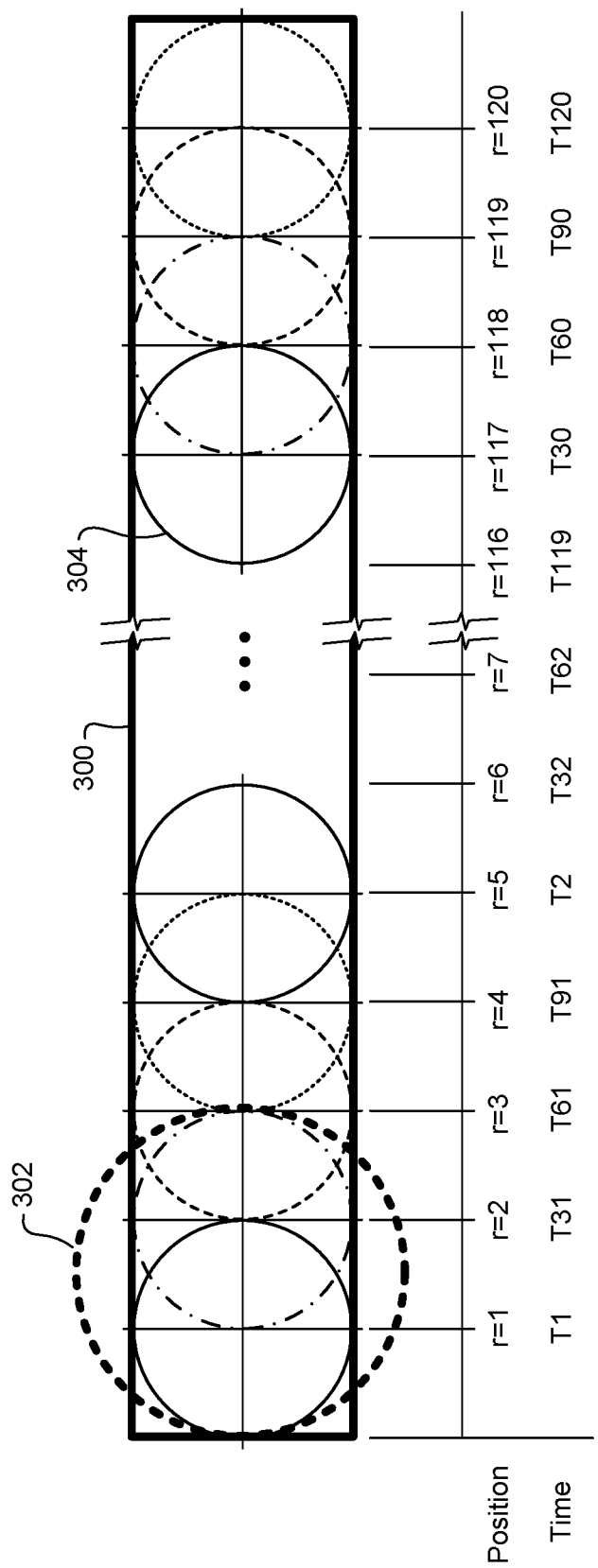
FIG. 3 illustrates a linear second scan pattern in accordance with an example embodiment of the present invention.

In the examples illustrated above, the field of view is linear, so that a 1-dimensional scan pattern (as shown in FIGS. 2 and 3, for example) is needed to cover the entire field of view. It will be appreciated that these scan patterns may be extended to cover a polygonal field of view, if desired. For example, LIDAR systems commonly are capable of scanning a rectangular field of view, which, for example, may have 120 spots laterally and 20 spots vertically, for total of 2400 spots. The spot positions may be separated by ¼ of the reference dimension, in which case a reference aperture receives energy from 4×4=16 spots. FIG. 4 is a table illustrating a 2-dimensional scan pattern suitable for such a 2-dimensional field of view. In the example of FIG. 4, the rectangular field of view 400 may conveniently be represented as a table having 20 rows and 120 columns. Each cell 402 of the table corresponds with a respective position in the field of view 400 to which light 104 may be directed by the steering device 114. The time at which each position in the field of view is illuminated by the light 104 is indicated by the number in the corresponding cell of FIG. 4. The reference dimension is illustrated by the circle 404 in the table, and the positions for which light is directed into the corresponding aperture are shown as a shaded region 406.

As may be seen in FIG. 4, the scan pattern follows a 4×4 modified raster scan. Accordingly, in a first pass, shots are directed to row 1, columns 1, 5, 9, 13 . . . 117; row 5, columns 1, 5, 9, 13 . . . 117; row 9, columns 1, 5, 9, 13 . . . 117; row 13, columns 1, 5, 9, 13 . . . 117; etc. until rows 1, 5, 9, 13 and 17 have been scanned. In the second pass shots are directed to row 1, columns 2, 6, 10, 14 . . . 118; row 5, columns 2, 6, 10, 14 . . . 118; row 9, columns 2, 6, 10, 14 . . . 118; row 13, columns 2, 6, 10, 14 . . . 118; etc. until rows 1, 5, 9, 13 and 17 have been scanned. This pattern is repeated though passes 3 and 4 until all of the columns in rows 1, 5, 9, 13 and 17 have been scanned. Passes 5-8 repeat the pattern for passes 1-4, but for rows 2, 6, 10, 14 and 18. Passes 9-12 repeat the pattern for passes 5-8, but for rows 3, 7, 11, 15 and 19. Finally, passes 13-16 repeat the pattern for passes 9-12 for rows 4, 8, 12, 16 and 120.

In the example of FIG. 4, a total of 16 shots (four shots in each of four adjacent rows) are required to completely cover a given aperture, and the minimum interval between two successive shots directed within the aperture is 121 (pertaining to shots 1681 and 1802) times the shot period T. For the case of T=2 µs, the minimum interval between successive shots incident on any given aperture is 121*2 µs=242 µs. An AEL of 200 nJ per 5 µs interval is equivalent to 9680 nJ per 242 µs interval. This yields a maximum safe laser energy (based on the AEL calculation) of 9680 nJ per shot, or 484 nJ per pulse (assuming 20 pulses per shot). However, this exceeds the maximum permissible energy of 200 nJ for a single pulse (AEL=200 nJ for 5 ps<t≤5 µs), as defined by ANSI standard Z136.1-2014 or IEC 60825-1. Accordingly, the laser energy in the embodiment of FIG. 4 would be limited to 200 nJ per pulse. However, this still represents 70 times more energy per pulse (equivalent to 18 dB) than would be permitted using conventional techniques. Following the calculations above, it will be seen that an 18 dB increase in the energy of each pulse emitted by the transmitter translates into an increased detection range through fog of approximately 35 meters relative to conventional systems.

The examples of FIGS. 2-4 describe scan patterns in which the light 104 is steered in each row such that the separation between any two successive shots is equal to the reference dimension. In the example of FIG. 4, this pattern is extended to two dimensions such that the separation between any two successively scanned rows is also equal to the reference dimension. This achieves the objective of ensuring that at least one intermediary shot is emitted by the transmitter 102 between a first shot directed within a given aperture 120 and a next shot directed within that same aperture. However, it is contemplated that there are many alternative scan patterns that may also be used to ensure that the separation between any two successive shots is equal to or greater than the reference dimension. Thus it will be appreciated that the specific scan patterns described in the present disclosure are illustrative, and not limitative of the present invention.

Based on the foregoing discussion, it will be seen that increasing the number of intermediary shots enables a corresponding increase in the laser output power, up to the single pulse limit (for example AEL=200 nJ for 5 ps<t≤5 µs) imposed by the eye safety regulations. Beyond this point, no further increase in laser output power can be obtained by increasing the number of intermediary shots, without exceeding eye safety limits.

Figure 5:
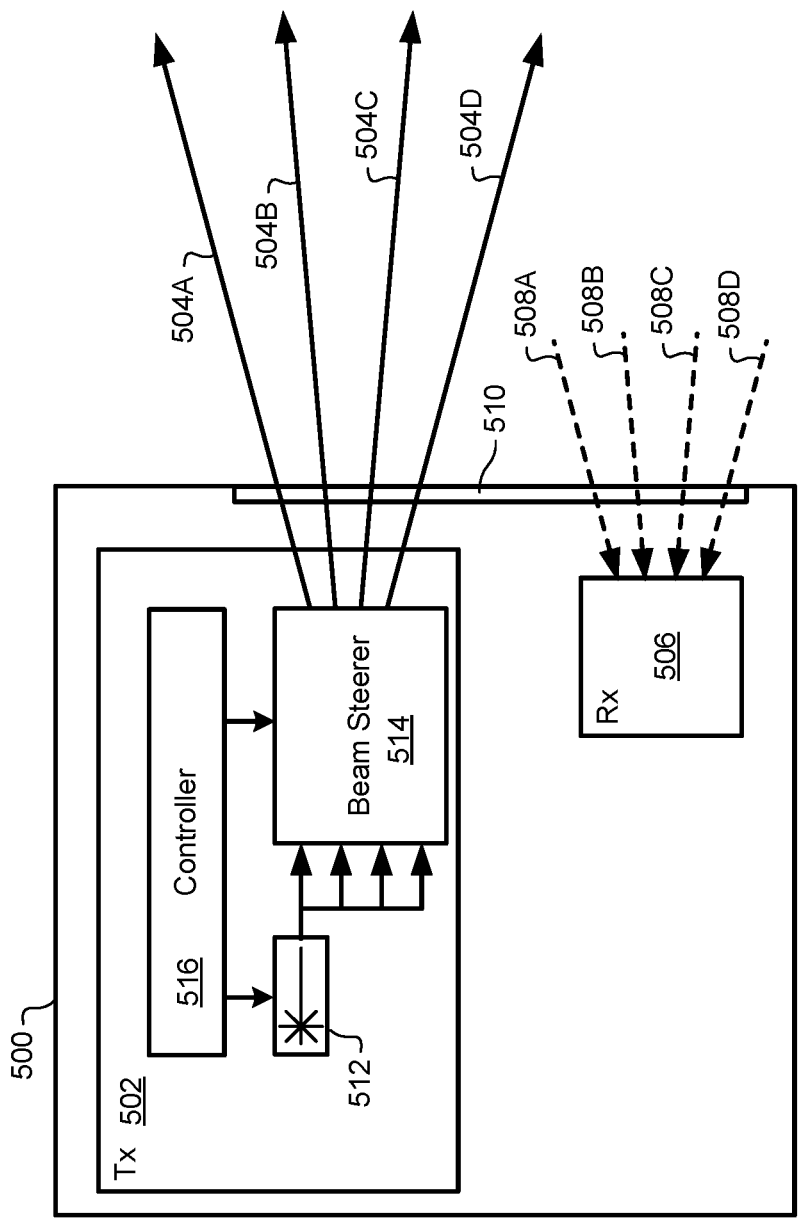
FIG. 5 schematically illustrates elements and operation of a second example Light Detection and Ranging (LIDAR) system.
Figure 6:
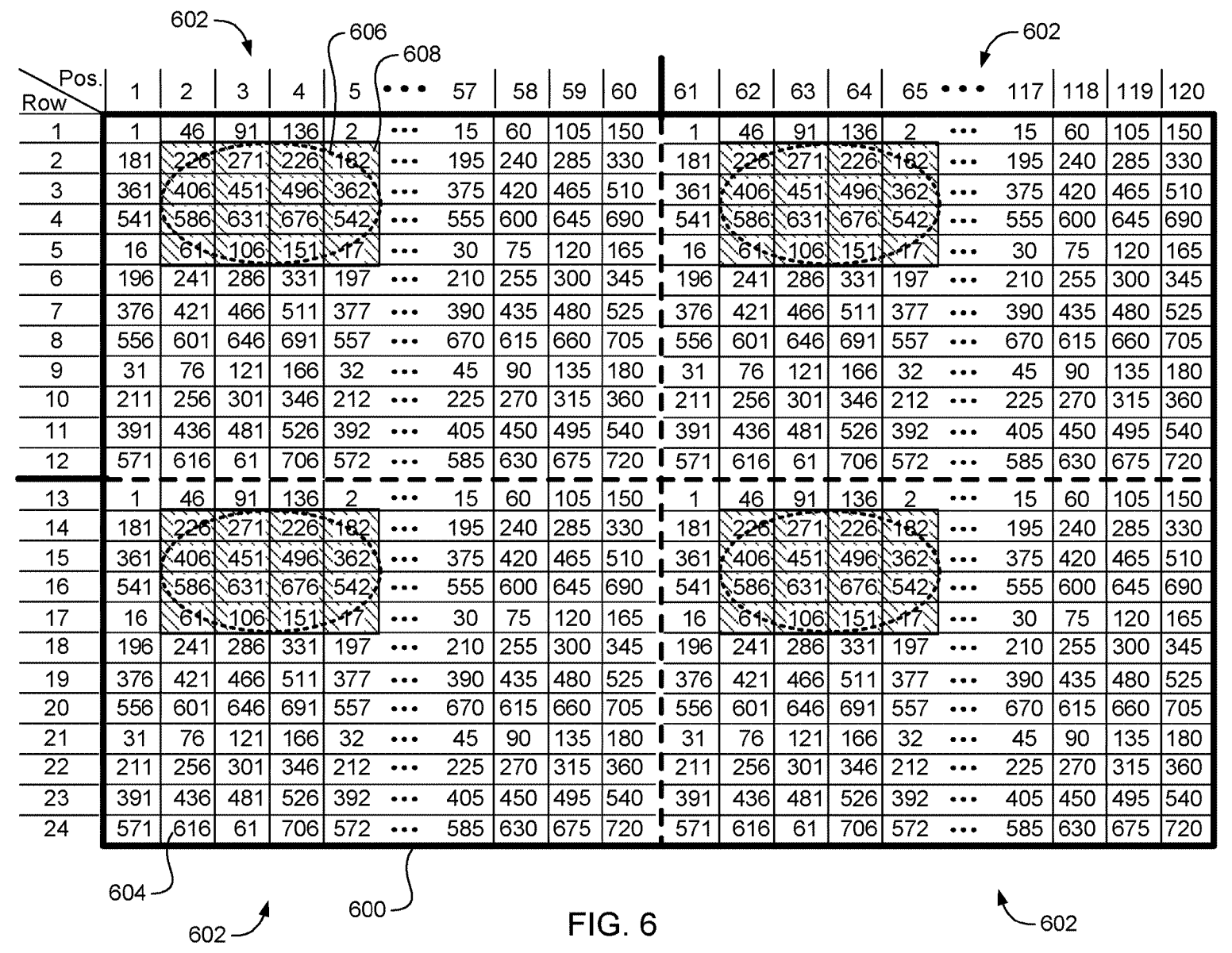

The embodiments described above with reference to FIGS. 2-4 the laser 112 and the steering device 114 are configured to output a single beam. As noted above, the laser 112 and the steering device 114 may alternatively be configured to output two or more beams simultaneously. For example, FIG. 5 schematically illustrates an example LIDAR system 500 in which light emitted by the laser 512 is split into four beams 504A-504D, which are then directed by the steering device 514 (operating under control of the controller 516) to scan the field of view. The receiver 506 is similarly configured to detect reflected light 508A-508D corresponding to each of the transmitted beams 504A-504D, and compute corresponding time-of-flight and distance information for each beam. In such embodiments, the steering device 114 is further configured to provide a separation between any two of the beams 504 that is at least equal to the reference dimension, and the scan pattern is selected to provide, for all of the beams 504A-504D, a separation between any two successive shots that is at least equal to the reference dimension. FIG. 6 illustrates an example scan pattern.

In the embodiment of FIG. 6, the rectangular field of view 600 is divided into 24 rows of 120 positions each. Each of the four beams output from the laser 512 and the steering device 514 is directed to scan a respective quadrant 602 of the field of view 500, using an identical scan pattern. The reference dimension is four times the radius of the beam spot, and the scan pattern is represented as a table having 24 rows and 120 columns. Each cell 604 of the table corresponds with a respective position in the field of view 600 to which light 504 may be directed by the steering device 514. Each quadrant 602 of the field of view 600 may therefore be represented by a corresponding quadrant (in this example comprising 12 rows and 60 columns) of the table, as shown in FIG. 6. The time at which each position in the field of view is illuminated by one of the beams is indicated by the number in the corresponding cell 604 of the table. The reference dimension is illustrated by the ellipse 606 in each quadrant 602 of the table of FIG. 6, and the positions for which light is directed into the corresponding aperture are shown as a shaded region 608.

As may be seen in FIG. 6, each quadrant 602 is scanned using a scan pattern closely similar to that of FIG. 4, except that it is truncated to 12 rows and 60 columns. Furthermore, it will be seen that the four beams 504A-504D are separated from one another by 12 rows and 60 columns, which is significantly larger than the reference dimension. Accordingly, the embodiment of FIG. 6 achieves the objective of providing a separation between any two of the beams that is at least equal to the reference dimension, and the scan pattern is selected to provide, for all of the beams, a separation between any two successive shots that is at least equal to the reference dimension. In this example, detection of scattered reflected light 508A-508D may be accomplished by providing respective different receivers (each similar to that described above with reference to FIG. 1A) and restricting the field of view of each receiver to the appropriate one o the four quadrants. In an alternative arrangement, the transmitter 502 may be configured to emit each of the beams 504A-504D using a respective different wavelength, in which case optical filtering may be used to separate the corresponding reflected lights 508A-508D.

In the example of FIG. 6, a total of 16 shots (four shots in each of four adjacent rows) are required to completely cover a given aperture, and the smallest interval between any two shots directed into the aperture (in the illustrated example, shots 151 and 182) is 31 times the shot period T. For the case of T=2 µs, the smallest interval between successive shots incident on any given aperture is 31*2 µs=62 µs. An AEL of 200 nJ per 5 µs interval is equivalent to 2480 nJ per 62 µs interval. This yields a maximum safe laser energy (based on the AEL calculation) of 2480 nJ per shot, or 124 nJ per pulse (assuming 20 pulses per shot). This still represents approximately 42 times more energy per pulse (equivalent to approximately 16 dB) than would be permitted using conventional techniques.

An advantage of the embodiment of FIG. 6 is that the entire field of view is scanned in 720 times the shot period T, which is significantly faster than the 2880*T that would be required if a single-beam was used.

Figure 7:
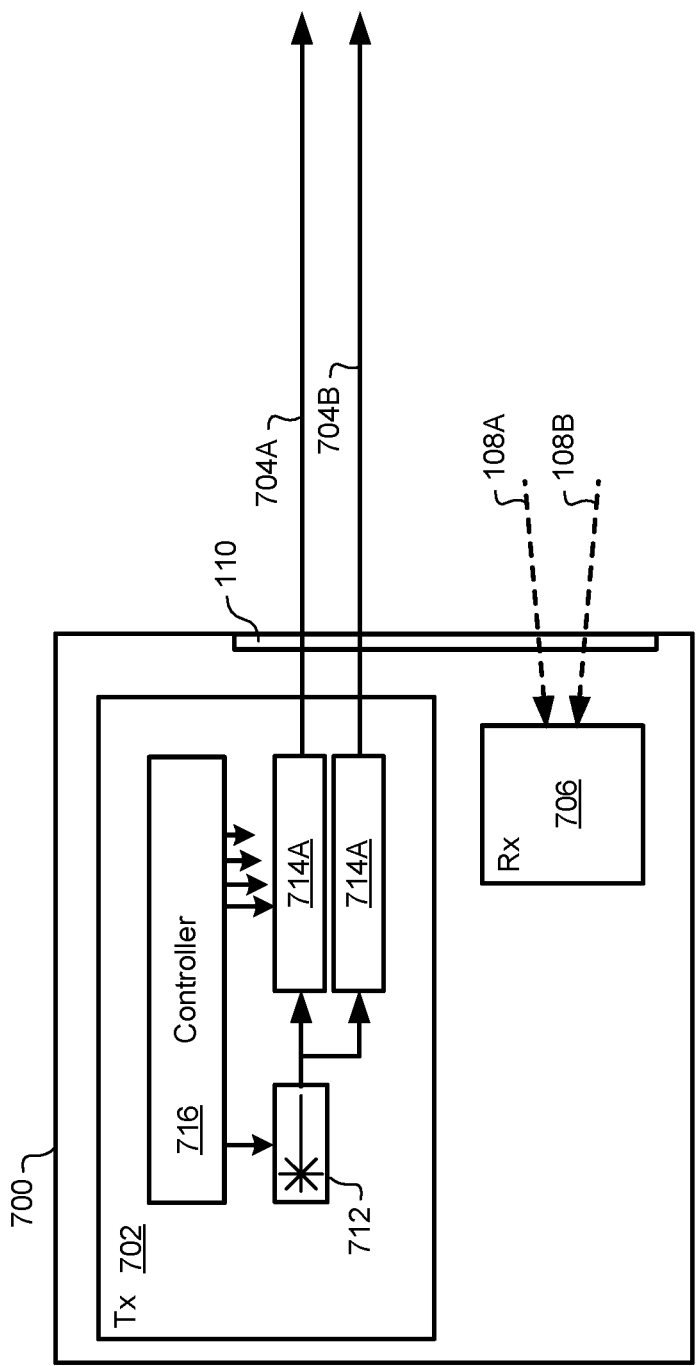
FIG. 7 schematically illustrates elements and operation of a third example Light Detection and Ranging (LIDAR) system.

In the embodiment of FIG. 6, there are four beams 504A-504D, which are steered in unison to scan a respective quadrant 602 of the field of view. If desired, more or fewer than four beams may be used. Similarly, the beams may be steered independently of each other. For example, FIG. 7 schematically illustrates an example LIDAR system 700 in which light emitted by the laser 712 is split into two beams, which are then directed by independent steering devices 714A and 714B (operating under control of the controller 716) to scan the field of view. In such a case, each of beams 704A-704B can be steered in any desired direction to scan its respective portion of the field of view. If desired, the respective portions of the field of view scanned by each beam may be arranged in quadrants or sectors, as in the embodiment of FIG. 6. However, other options may also be used. If desired, the respective portions of the field of view scanned by each beam may have cover any suitable portion of the field of view, and may be interleaved in any suitable manner. The key limitation is that in all cases, there must be an interval of at least one (and preferably more than one) intermediary shot between a first shot (from any beam) incident on a given aperture and a next shot (again, from any beam) incident on that same aperture.

The example embodiments described above with reference to FIGS. 2-6 describe linear and rectangular fields of view and scan patterns defined in terms of specific numbers of shots or positions. Clearly, the field of view may be defined in any suitable manner, and may have any desired shape. Similarly, 1-dimensional and 2-dimensional scan patterns may be defined in any suitable manner to cover the field of view.

If desired, the shot density (i.e. the spacing between adjacent shot positions) may be constant (as in the embodiments of FIGS. 2-5) or may be varied within the field of view. For example, in the embodiments of FIGS. 4 and 5, a rectangular field of view is scanned using a scan pattern represented as a table with a given number of rows and columns. Thus in the illustrated embodiments each row has the same number of columns, and so is scanned using the same number of shots. If desired, the number of columns in each row may be varied so that, for example, rows near the center of the field of view have more columns (and so are scanned using more shots) than rows near the periphery of the field of view. Alternatively, the spacing between shots may be varied within a row, so that, for example, shots directed near the center of the field of view are positioned closer together than shots directed near the periphery of the field of view. In all of these cases, the scan pattern must be selected to ensure that there is at least one (and preferably more than one) intermediary shot between a first shot directed to a given aperture and a next shot directed to that same aperture.

If desired, the LIDAR system controller may change the scan pattern during operation of the system. For example, the controller may store information defining a set of two or more different scan patterns, and select one of the set of scan patterns as a current pattern. The information defining the selected current pattern is subsequently used by the controller to direct the laser and steering device(s) to scan the field of view (or a selected region of it) in accordance with the selected current pattern. At a later time (for example in response to changing conditions) the controller may select a different one of the set of patterns as the current pattern. The information defining the new current pattern is subsequently used by the controller to direct the laser and steering device(s) to scan the field of view (or a selected region of it) in accordance with the new current pattern.

If desired, the LIDAR system controller may implement respective different scan patterns in respective different regions of the field of view. For example, a selected region of the field of view may be scanned more frequently than another region of the field of view, to thereby gather more accurate information or more timely information about objects in the selected region. For example, in a fast-moving vehicle, information about objects directly in front of the vehicle is more critical than information about objects to the sides or the rear of the vehicle, because objects directly in front of the vehicle represent a more imminent collision hazard. Thus, the scan pattern(s) may be designed such that one or more selected regions of the field of view are scanned more frequently than other regions of the field of view. FIG. 8 illustrates an example, in which a central region of the field of view is scanned more frequently than the rest of the field of view.

In the embodiment of FIG. 8, the rectangular field of view 800 is divided into 24 rows of 120 positions each. This field of view 800 is further subdivided into a pair of regions, including a first region (which, in this example, is discontinuous) composed of rows 1-8 (Region 1A) and rows 17-24 (Region 1B), and a second region composed of rows 9-16 (Region 2). Each of these regions can be scanned using a respective one of the beams 704-704B emitted by the LIDAR system 700 of FIG. 7. Region 1 may be scanned using a scan pattern that is closely similar to that of FIG. 4, except that it is truncated to 16 rows and 120 columns, and so is scanned in a period equivalent to 1920 times the shot period T. Region 2 may be scanned using a scan pattern that is also closely similar to that of FIG. 4, except that it is truncated to 8 rows and 120 columns, and so is scanned in a period equivalent to 960 times the shot period T. With this arrangement, the Region 2 will be scanned at twice the frequency of Region 1, so that information of objects within the Region 2 is updated at double the rate of Region 1.

If desired, the selected region(s) in which the scan frequency is increased may be statically defined, and thus would not change during operation of the LIDAR system. Alternatively, the selected regions in which the scan frequency is increased may be dynamically defined, for example in accordance with software executing in a processor of the LIDAR system. In such a case, the LIDAR system may change the scan frequency in a selected region of the field of view during operation, for example in response to changing conditions such as the speed of a vehicle on which the LIDAR system is mounted, or the detection of other objects in the field of view (such as other vehicles around the vehicle on which the LIDAR system is mounted).

Embodiments of the present invention may be provided as any suitable combination of hardware and software. For example, the present invention may be embodied as a LIDAR system configured to implement techniques in accordance with the present invention, or as software (or, equivalently, firmware) stored on a non-transitory machine readable storage medium and including software instructions for controlling a processor of a LIDAR system to implement techniques in accordance with the present invention, or as a non-transitory machine readable storage medium storing software (or, equivalently, firmware) including software instructions for controlling a processor of a LIDAR system to implement techniques in accordance with the present invention. For example, in a LIDAR system of the type illustrated in FIG. 1, specific embodiments of the present invention may take the form of software (or, equivalently, firmware) stored in a memory (not shown) of the controller 116 and including software instructions for controlling the controller 116 to implement techniques in accordance with the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

I claim:

1. An optical apparatus comprising:
    a light source configured to emit light composed of a sequence of shots;
    a window; and
    a steering device having an optical element configured to receive the sequence of shots, the optical element having a parameter and being configured to receive a control signal to control the parameter to steer the shots emitted by the light source through the window and across a field of view of the optical apparatus, in accordance with a predefined scan pattern such that, at a position outside the apparatus and spaced apart from the window, at least one intermediate shot is steered outside an aperture defined by an eye safety regulation between each shot steered by the optical element within the aperture defined by the eye safety regulation and an immediately subsequent shot steered by the optical element within the same aperture defined by the eye safety regulation, each intermediate shot being steered by the optical element inside the field of view but outside the aperture defined by the eye safety regulation, any particular shot steered by the optical element within the aperture defined by the eye safety regulation being steered at an angle that is different from another angle for an immediately succeeding shot steered within the aperture defined by the eye safety regulation.

2. The optical apparatus as claimed in claim 1, wherein the predefined scan pattern is two-dimensional.

3. The optical apparatus as claimed in claim 1, wherein the eye safety regulations include any one or more of American National Standards Institute standard Z136.1-2014, International Electrotechnical Commission standard 60825-1, and successors thereof.

4. The optical apparatus as claimed in claim 1, wherein an energy of each shot Es is determined based on an Accessible Emission Limit defined by the eye safety regulation, Es being defined as an amount of energy incident on the aperture defined by the eye safety regulation during a predetermined time interval, wherein:

$$Es = \left(\frac{AEL}{t}\right) \times (N+1)T$$

where AEL is a defined amount of energy incident on the aperture defined by the eye safety regulation during the predetermined time interval, t is a duration of the predetermined time interval, N is a number of the at least one intermediate shot, and T is a shot period.

5. The optical apparatus as claimed in claim 4, wherein each of the at least one intermediate shot comprises a plurality of pulses.

6. The optical apparatus as claimed in claim 1, wherein the light is emitted by the optical apparatus in a single beam, and wherein the optical element is further configured to steer the shots of the single beam in accordance with the predetermined scan pattern such that a separation between any two successive shots is equal to or greater than a reference dimension corresponding to the aperture defined by the eye safety regulation.

7. The optical apparatus as claimed in claim 1, wherein the light is emitted by the optical apparatus in two or more beams, and wherein the optical element is further configured to steer shots of the two or more beams in accordance with the predefined scan pattern such that a separation between shots of any two or more beams is at least equal to a reference dimension corresponding to the aperture defined by the eye safety regulation, and, for all of the beams, a separation between any two successive shots is equal to or greater than the reference dimension.

8. The optical apparatus as claimed in claim 7, wherein the two or more beams comprise a first beam and a second beam, and wherein the optical element is configured to steer the first beam independently of the second beam.

9. The optical apparatus as claimed in claim 8, wherein the optical element is further configured to steer the first beam to scan a first region of the field of view of the optical apparatus in accordance with a first scan pattern, and to steer the second beam to scan a second region of the field of view of the optical apparatus in accordance with a second scan pattern.

10. The optical apparatus as claimed in claim 9, wherein the first region is discontinuous.

11. The optical apparatus as claimed in claim 10, further comprising:
a photodetector configured to detect scattered light from an external object, and to generate a photodetector signal in accordance with the scattered light; and
a processing unit configured to process the photodetector signal in accordance with predetermined instructions to infer information about the external object.

12. The optical apparatus as claimed in claim 1, further comprising a controller operably connected to the optical element and configured to generate the control signal to cause the optical element to steer the shots emitted by the light source in accordance with the predefined scan pattern.

13. The optical apparatus as claimed in claim 1, wherein the optical element comprises:
an optical splitter configured to supply light from the light source to a plurality of optical paths;
a phase delay element optically coupled to each optical path; and
an emitter optically coupled to each phase delay element.

14. The optical apparatus as claimed in claim 13, wherein the light source comprises a tunable laser and the control signal is configured to control the tunable laser.

15. The optical apparatus as claimed in claim 13, wherein each phase delay element is configured to be tuned in accordance with the control signal.

16. The optical apparatus as claimed in claim 1, wherein the optical element comprises a diffraction grating.

17. The optical apparatus as claimed in claim 1, wherein the optical element comprises a spatial light modulator.

18. A method of controlling an optical apparatus comprising a light source configured to emit light comprising a sequence of shots, a window and an optical element optically coupled to the light source, the method comprising controlling a parameter of the optical element to steer the shots emitted by the light source through the window and across a field of view of the apparatus, in accordance with a predefined scan pattern such that, at a position outside the apparatus and spaced apart from the window, at least one intermediate shot is steered outside an aperture defined by an eye safety regulation between each shot steered by the optical element within the aperture defined by the eye safety regulation and an immediately subsequent shot steered by the optical element within the same aperture defined by the eye safety regulation, each intermediate shot being steered by the optical element inside the field of view but outside the aperture defined by the eye safety regulation, any particular shot steered by the optical element within the aperture defined by the eye safety regulation being steered at an angle that is different from another angle for an immediately succeeding shot steered within the aperture defined by the eye safety regulation.

19. The method as claimed in claim 18, wherein the predefined scan pattern is two-dimensional.

20. The method as claimed in claim 18, wherein an energy of each shot Es is determined based on an Accessible Emission Limit defined by the eye safety regulation, Es being defined as an amount of energy incident on the aperture defined by the eye safety regulation during a predetermined time interval, wherein:

$$Es = \left(\frac{AEL}{t}\right) \times (N+1)T$$

where AEL is a defined amount of energy incident on the aperture defined by the eye safety regulation during the predetermined time interval, t is a duration of the predetermined time interval, N is a number of the at least one intermediate, and T is a shot period.

21. The method as claimed in claim 20, wherein each shot comprises a plurality of pulses, and wherein an energy of each pulse is:

$$Ep = \frac{Es}{P}$$

where: P is a number of pulses in each shot; and
wherein when Ep exceeds an eye-safe limit for a single pulse as defined by the eye safety regulation, Ep is set to equal the eye-safe limit for a single pulse.

22. The method as claimed in claim 18, wherein the light is emitted by the optical apparatus in two or more beams, and wherein the parameter of the optical element is further controlled to steer shots of the two or more beams in accordance with the predefined scan pattern such that a separation between shots of any of the two or more beams is at least equal to a reference dimension corresponding to the aperture defined by the eye safety regulation, and, for all of the beams, a separation between any two successive shots is equal to or greater than the reference dimension.

23. The method as claimed in claim 22, wherein the two or more beams comprise a first beam and a second beam, and wherein the parameter of the optical element is controlled to steer the first beam independently of the second beam.

24. The method as claimed in claim 23, wherein the optical element is further controlled to steer the first beam to scan a first region of the field of view of the optical apparatus in accordance with a first scan pattern, and to steer the second beam to scan a second region of the field of view of the optical apparatus in accordance with a second scan pattern.

* * * * *